J. DENSMORE.
Wheel-Harrow.
No. 66,684.
Patented July 16, 1867.
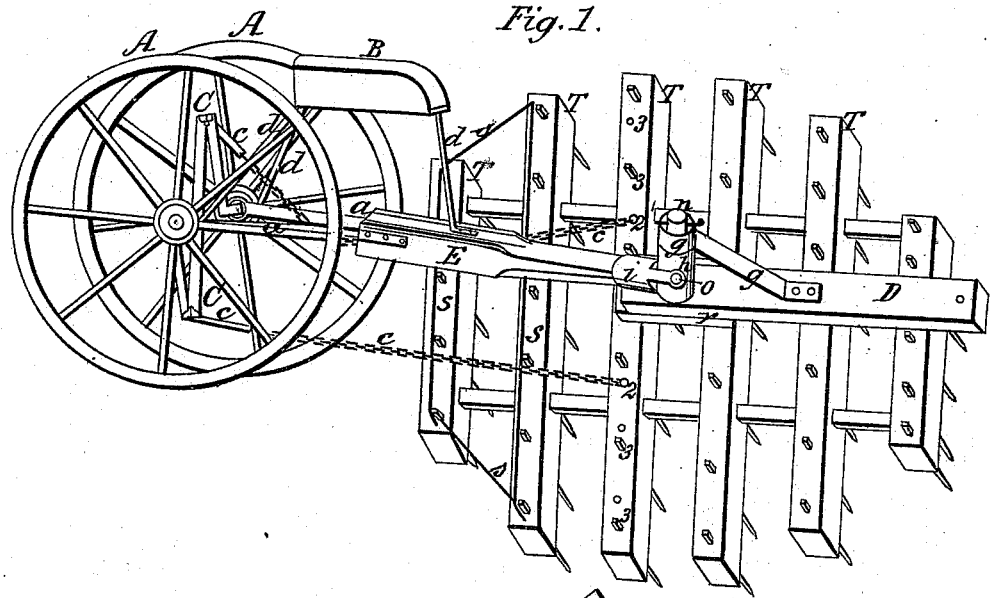
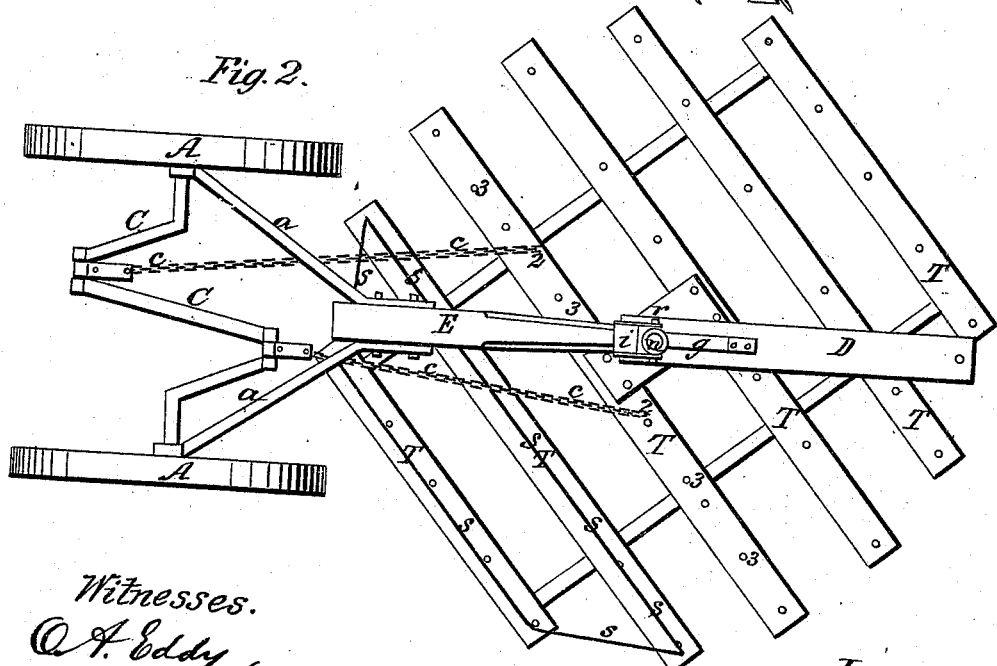
Witnesses.
O. A. Eddy
Justus Day
Inventor.
Jay Densmore

United States Patent Office.

JAY DENSMORE, OF HOLLEY, NEW YORK, ASSIGNOR TO L. A. DENSMORE AND JUSTUS DAY, OF SAME PLACE.

Letters Patent No. 66,684, dated July 16, 1867.

IMPROVEMENT IN RECIPROCATING HARROW.

The Schedule referred to in these Letters Patent and making part of the same.

Be it known that I, JAY DENSMORE, of Holley, in the county of Orleans, and State of New York, have invented a new and useful Reciprocating Harrow; and I do hereby declare that the following is a full, clear, and exact description of the construction and operation of the same, reference being had to the annexed drawings, making a part of this specification, in which—

Figure 1 is a perspective view; and

Figure 2 a top view with the driver's seat removed.

I construct my harrow in any convenient form, in the centre of which I have the wrist-pin $n$ cast solid to the plate $r$ which is firmly secured to the frame of the harrow, to which wrist-pin the draught-pole D and the pole E of the carriage A A are attached in such a manner that the pole E of the carriage A A is free to turn in any direction by means of the sleeves $i$ and $h$ and the joint $o$, as shown in the drawings. The draught-pole D is free to turn upon the wrist-pin $n$ horizontally, but is prevented from rising by the brace $g$. The whole is held down upon the wrist-pin $n$ by the pin 1 or its equivalent. In the carriage A A I have the double crank-axle C C, or its equivalent, to each crank of which is attached one end of the chains $c\ c\ c\ c$, or their equivalents, the other ends of said chains being attached to the frame of the harrow, one on each side of the wrist-pin $n$ at the points 2 2. The driver's seat B is attached to the frame of the carriage A A, as shown in fig. 1.

When the harrow is drawn over the ground the wheels of the carriage A A cause the cranks C C to revolve, which being connected to the harrow by the chains $c\ c\ c\ c$, cause the harrow to reciprocate, the guards $s\ s\ s\ s$ keeping the chains from catching upon the heads of the harrow-teeth under them. The amount of reciprocating motion can be regulated by moving the points of attachment of the chains $c\ c\ c\ c$ to the harrow, either nearer or more distant from the wrist-pin $n$ to the eyes 3 3 3 3.

What I claim as my invention, and desire to secure by Letters Patent, is—

A reciprocating harrow operated by cranks, or their equivalents.

Also the carriage A A behind the reciprocating harrow, as described.

Also the driver's seat B, in combination with the carriage A A, as described.

Also the wrist-pin $n$, the draught-pole D, the sleeves $i$ and $h$, the joint $o$, or their equivalents, the brace $g$, the chains $c\ c\ c\ c$, or their equivalents, the guards $s\ s\ s\ s$, all in combination with a reciprocating harrow, as and for the purposes set forth and described.

JAY DENSMORE.

Witnesses:
O. A. EDDY,
JUSTUS DAY.